United States Patent
Tice et al.

[11] Patent Number: 6,163,263
[45] Date of Patent: Dec. 19, 2000

[54] CIRCUITRY FOR ELECTRICAL DEVICE IN MULTI-DEVICE COMMUNICATIONS SYSTEM

[75] Inventors: Lee D. Tice, Bartlett; Robert J. Clow, North Aurora; Manley S. Keeler, Naperville, all of Ill.

[73] Assignee: Pittway Corporation, Chicago, Ill.

[21] Appl. No.: 09/243,216

[22] Filed: Feb. 2, 1999

[51] Int. Cl.[7] .................................................. G08B 21/00
[52] U.S. Cl. ........................ 340/635; 340/508; 340/511; 340/512
[58] Field of Search ................................... 340/635, 508, 340/509, 510, 511, 512, 513

[56] References Cited

U.S. PATENT DOCUMENTS

| | | | |
|---|---|---|---|
| 3,665,461 | 5/1972 | Gnägi et al. | 340/512 |
| 3,713,142 | 1/1973 | Getchell | 340/512 |
| 3,852,713 | 12/1974 | Roberts et al. | 340/512 |
| 4,435,698 | 3/1984 | Klett | 340/512 |
| 4,916,432 | 4/1990 | Tice et al. | 340/518 |
| 4,973,943 | 11/1990 | Arima | 340/512 |
| 5,117,219 | 5/1992 | Tice et al. | 340/518 |
| 5,155,480 | 10/1992 | Pfeiffer | 340/508 |
| 5,440,293 | 8/1995 | Tile | 340/511 |
| 5,525,962 | 6/1996 | Tice | 340/506 |
| 5,708,414 | 1/1998 | Peltier et al. | 340/511 |

OTHER PUBLICATIONS

U.S. Patent Application Ser. No. 09/184,409, Keeler et al, filed Nov. 02, 1998.
U.S. Patent Application Ser. No. 09/189,383, Tice et al., filed Nov. 10, 1998.
U.S. Patent Application Ser. No. 09/205,462, Tice et al., Dec. 04, 1998.
U.S. Patent Application Ser. No. 09/210,041, Tice et al., filed Dec. 11, 1998.
U.S. Patent Application Ser. No. 08/906,277, Tice, filed Aug. 05, 1997.

*Primary Examiner*—Daniel J. Wu
*Assistant Examiner*—John Tweel, Jr.
*Attorney, Agent, or Firm*—Rockey, MIlnamow & Katz, Ltd.

[57] ABSTRACT

A self-monitoring power supply can be incorporated into electrical devices which are part of a multi-device communication system. The power supply is energized by electrical energy received from a medium on an intermittent basis. The self-monitoring circuitry assures that the device has sufficient energy for carrying out its functions. Noise rejection and noise immunity can be enhanced in such devices by circuitry which upon detection of a transmission start signal or a clock pulse locks out data signals for a predetermined period of time and upon detection of a data signal locks out transmission start or clock pulses for a predetermined period of time.

54 Claims, 9 Drawing Sheets

CIRCUITRY FOR ELECTRICAL DEVICE IN MULTI-DEVICE COMMUNICATIONS SYSTEM

FIELD OF THE INVENTION

The invention pertains to monitoring and control circuits for devices coupled to multi-device communications systems. More particularly, the invention pertains to self-monitoring power supplies and noise rejecting circuits for such devices.

BACKGROUND OF THE INVENTION

It has been recognized that electrical devices which are part of multiple device communication systems benefit from circuitry which enhances reliability of operation of the respective devices. In wired systems, it has been known to use end-of-line relays. The relays change state with loss of electrical energy on the lines. Such known systems, however, do not measure actual power supply voltage available for operational purposes.

In non-wired systems, it has been known to conduct local power supply tests on a periodic basis. For example, it has long been known to conduct intermittent tests of battery powered electrical devices, such as smoke detectors, to confirm that the respective battery retains sufficient energy to properly operate the respective device when needed.

Multi-device communication systems have also been known to be subject to noise problems associated with the respective communication medium. For example, electrical noise from various sources can be coupled to communication lines in wired systems. Alternately, RF interference can intermittently create noise problems in wireless systems.

Known solutions to some of these problems have included the use of filters to eliminate signals having noise related frequencies. Alternately, multiple transmissions or checksums have been used to improve the likelihood that a message has been accurately received.

While generally useful, none of the known systems have provided completely satisfactory solutions to these problems under all conditions. It would be desirable to be able to continuously monitor available energy associated with respective electric devices during normal operating conditions. It would also be desirable to be able to improve noise immunity of such devices under various operating conditions. Finally, it would be most preferable to be able to achieve these objectives without introducing extensive additional complexity or costs into the respective noises.

SUMMARY OF THE INVENTION

An electrical device, usable in a multi-device communication system, incorporates a self-monitoring power supply. The supply is intermittently energized from an exterior source. The intermittently received energy is stored in the supply.

An output parameter, indicative of energy stored at the supply, is periodically monitored. Control circuitry in the device can compare a supply voltage or current to a predetermined value. Where inadequate energy is available, a warning signal or message can be generated.

Improved noise rejection can be achieved by incorporating clock and data lockout circuits in the device. Devices that receive clock and data signals from a transmitting source, via a medium, can be subject to noise which can cause false clock or data signals. Such false signals can be suppressed in a preferred embodiment by circuitry which generates a data rejecting signal for a predetermined period of time, once a clock signal has been detected. In addition, clock signals can be rejected, for a predetermined period of time, where a data signal has been detected.

Numerous other advantages and features of the present invention will become readily apparent from the following detailed description of the invention and the embodiments thereof, from the claims and from the accompanying drawings.

Figure 1:
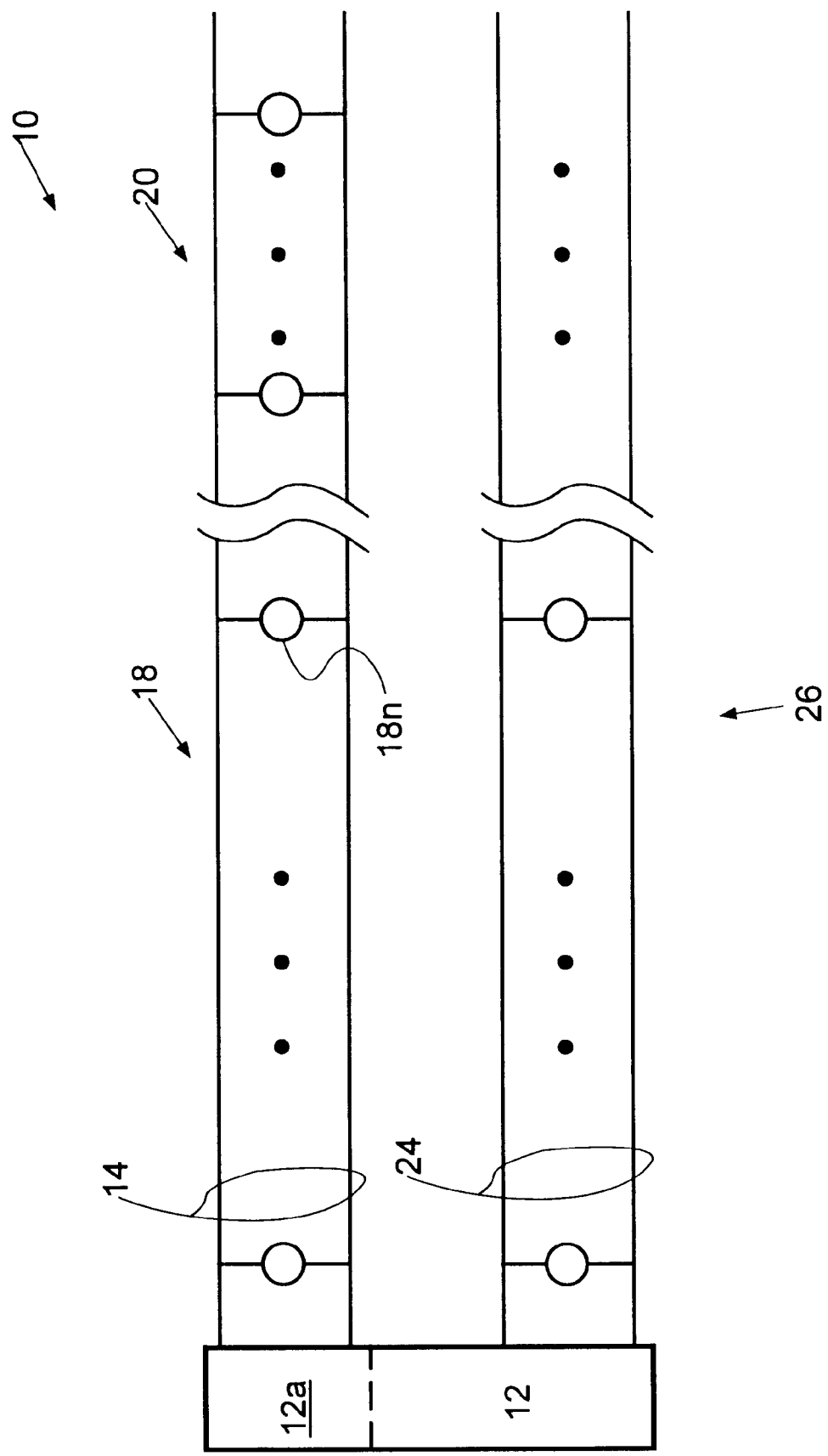
FIG. 1 is a block diagram of a system in accordance with the present invention.

DETAILED DESCRIPTION OF THE PREFERRED EMBODIMENTS:

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a system 10 which can be used for monitoring a plurality of conditions in one or more regions to be supervised. The system 10 includes a common control unit or device 12 which could be implemented as one or more interconnected programmed processors and associated, prestored instructions.

The unit 12 includes an interface 12a for coupling, for example, to a communications medium 14, illustrated in FIG. 1 for exemplary purposes only as an optical or electrical cable.

Coupled to medium 14 is a plurality of ambient condition detectors 18 and a plurality of control or function units 20. It will be understood that the relative arrangement of the members of the pluralities 18 and 20 relative to the medium 14 is not a limitation of the present invention. The unit 12 can communicate with members of the pluralities 18 or 20, or these members can communicate among themselves using a protocol to be discussed subsequently.

The members of the plurality 18 can include intrusion sensors, position sensors, gas sensors, fire sensors such as smoke sensors, thermal sensors or the like, and gas sensors, all without limitation. The members of the plurality 20 can include solenoid actuated control or function implementing units, display devices, printers or the like.

Also coupled to the control unit 12 via a medium 24, illustrated for example as a pair of electrical cables, is a plurality 26 of alarm indicating output devices. These could include audible or visible output devices without limitation, speech output devices and the like. The devices 26 are intended to broadcast a message, which might indicate alarm conditions, in one or more predetermined regions.

Figure 1A:
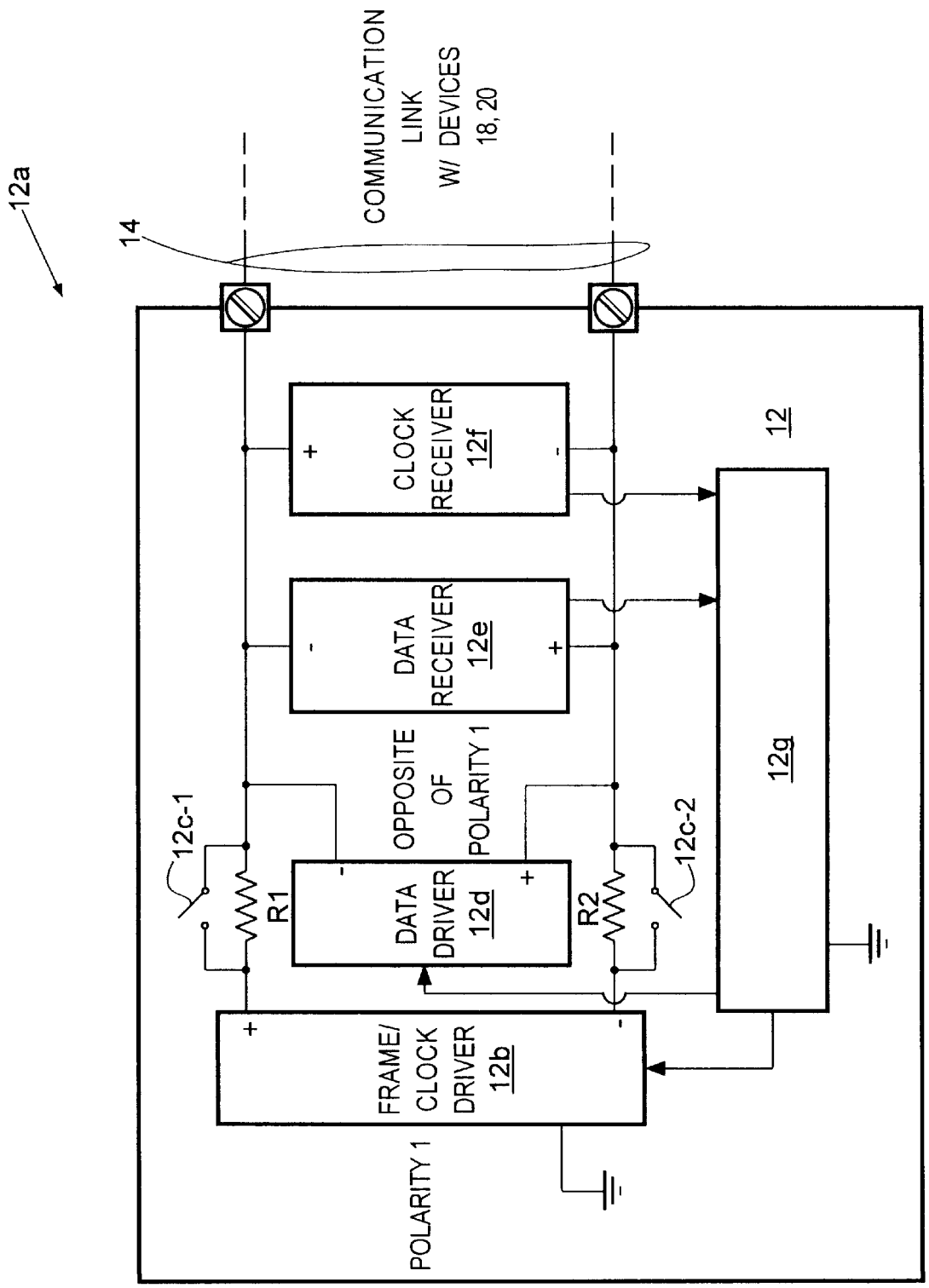
FIG. 1A is a block diagram of communication line interface circuitry.

FIG. 1A illustrates additional details of interface 12a. The interface includes frame/clock drive circuitry 12b which is coupled to controllable switches 12c-1, -2. Switches 12c-1, -2 provide a short circuit path, when closed, around relatively high impedance elements R1 and R2. Data drive circuitry 12d, data receive circuitry 12e and clock receive circuitry 12f are all coupled across communication link 14. Switches 12c-1, -2 could be implemented as solid state switches with control inputs as would be understood by those of skill in the art.

Interface 12a receives control signals from control element 12g which could be implemented with a programmed processor, associated preprogrammed instructions and interface circuits. It will also be understood that element 12g could receive via link 14, or any other selected input additional instructions, programs or data which could be stored therein for later execution or analysis, respectively.

In over-all operation, interface 12a via driver 12b provides framing and clock signals of a first polarity at a time when switches 12c-1, -2 are in a short circuit or closed state thereby presenting a low output impedance to the link 14. The clock receive circuitry 12f detects signal levels associated with clock pulses. It will be understood that the frame and clock signals impressed on the link 14 are voltage signals of a predetermined amplitude, for example 24 volts and 5 volts, respectively.

Interface 12a will switch to a high impedance output state, switches 12c-1, -2 effectively being open circuited, at a time when drive circuitry 12b is effectively outputting a zero volt signal. During this time interval data from units in pluralities 18 or 20 can be coupled to medium or link 14 with a second or different polarity, which could be opposite of the first polarity and received in data receive circuitry 12e. Alternately, during these time intervals interface 12a can transmit data via data drive circuits 12d to the members of the pluralities 18 or 20.

Data receive circuitry 12e includes one or more latches which retain data from the link 14 until reset. If a single latch is used, when the drive circuitry 12b sends the next clock pulse, that data latch can be reset. Resetting takes place when clock receiver circuitry 12f detects the next clock pulse. The final data value is retained in the storage element in receiver 12e and is reset at the start of the next frame. Where a plurality of data latches is provided, they could be reset simultaneously using a frame end signal.

Figure 2:
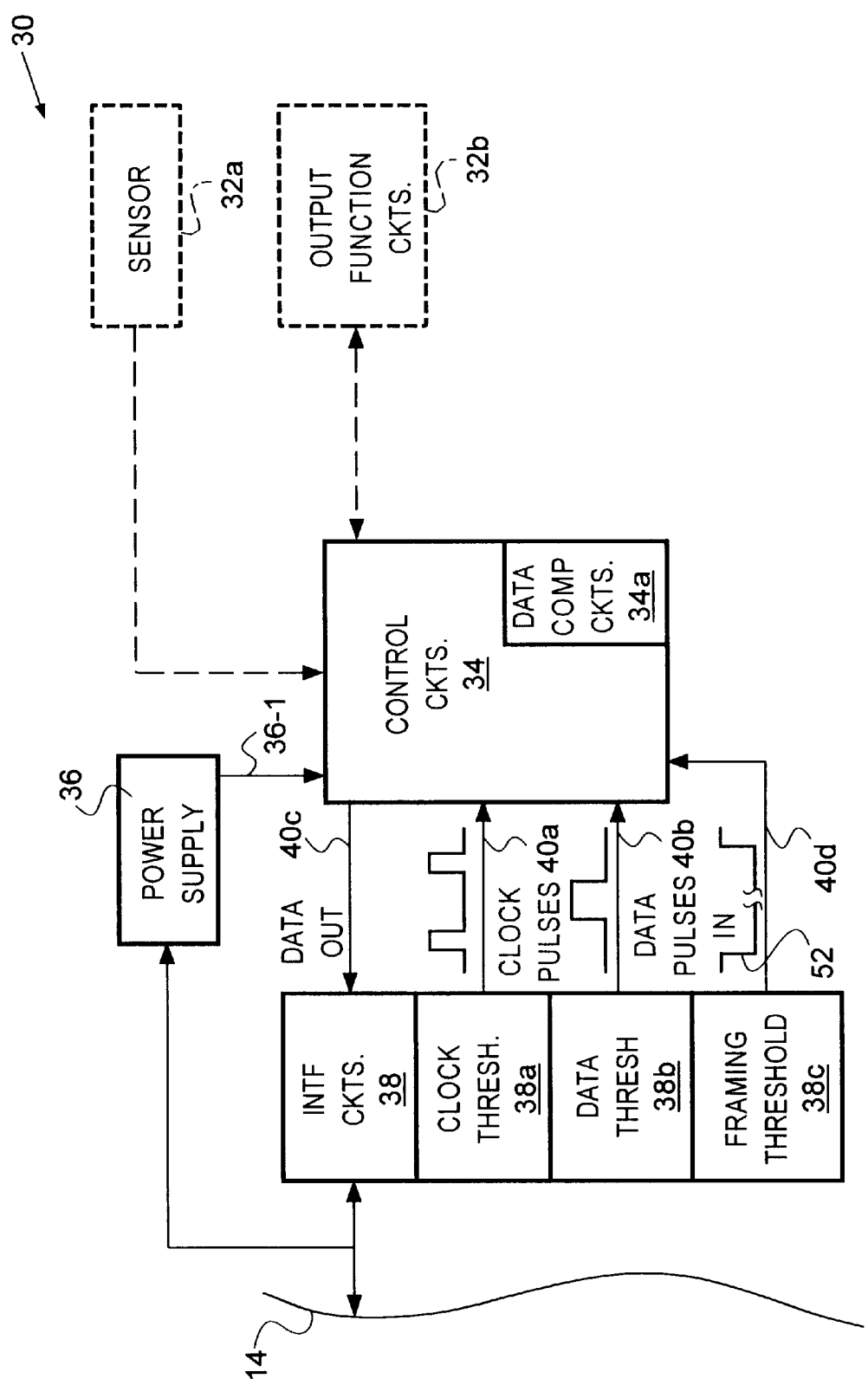
FIG. 2 is a block diagram of an electrical device usable with the system of FIG. 1.

FIG. 2 illustrates an exemplary electrical unit 30 usable with the system 10. The electrical unit 30 could, without limitation, correspond to a member of the plurality of detectors 18. In this instance, the unit 30 would incorporate an appropriate sensor 32a, illustrated in phantom. Alternately, the unit 30 could correspond to a member of the plurality of function modules 20. In this instance, the unit 30 would include output function implementing circuitry 32b illustrated in phantom.

The unit 30 would also include control circuitry 34. The circuitry 34 could be implemented using one or more programmed processors in combination with other hardwired logic circuits.

The unit 30 also includes a power supply 36 which, is illustrated in FIG. 2, could receive electrical energy from the communications medium 14. That energy could in turn be made available to the components of the unit 30. Alternately, the unit 30 could contain a power supply energized via a battery or another source without limitation. Power supply 36 can include self-monitoring circuitry. The monitoring circuitry can be used to monitor power available to operate the unit 30 under normal operating conditions.

Unit 30 also includes an interface circuitry indicated generally at 38. The interface circuitry 38 facilitates bidirectional communication with communication signals on the medium 14. For purposes of communicating with the common control unit 12, any other member of the plurality 18 or the plurality 20 detection circuits 38a, 38b and 38c are also provided.

In accordance with the communications protocol provided on the medium 14, clock detection circuitry 38a detects those signals which have a first polarity relative to the communications medium 14. Threshold detection circuitry 38b detects those electrical signals which exhibit a second or opposite polarity relative to the medium 14. Circuitry 38c detects message framing signals.

Those signals detected by threshold circuitry 38a, clock pulses in accordance with the communications protocol system 10, can be presented on a line 40a to the control element 34. Additionally, those signals detected by circuitry 38b, in accordance with the protocol of the system 10, can be presented as data pulses on a line 40b. Control element 34 is also able to communicate via a line 40c and interface circuitry 38 with either the common control unit 12 or members of the plurality 18 or 20 without limitation.

Control circuitry 34 can also include data input/output comparison circuitry 34a. Circuitry 34a can be implemented in whole or in part using hardwired or programmed circuitry.

It will be understood that one use of the protocol herein is being discussed with respect to the system 10. However, the purpose or function of the system 10 is not a limitation of the present invention. The present protocol could be used with any distributed unit communication system without departing from the spirit and scope of the present invention.

Figure 3:
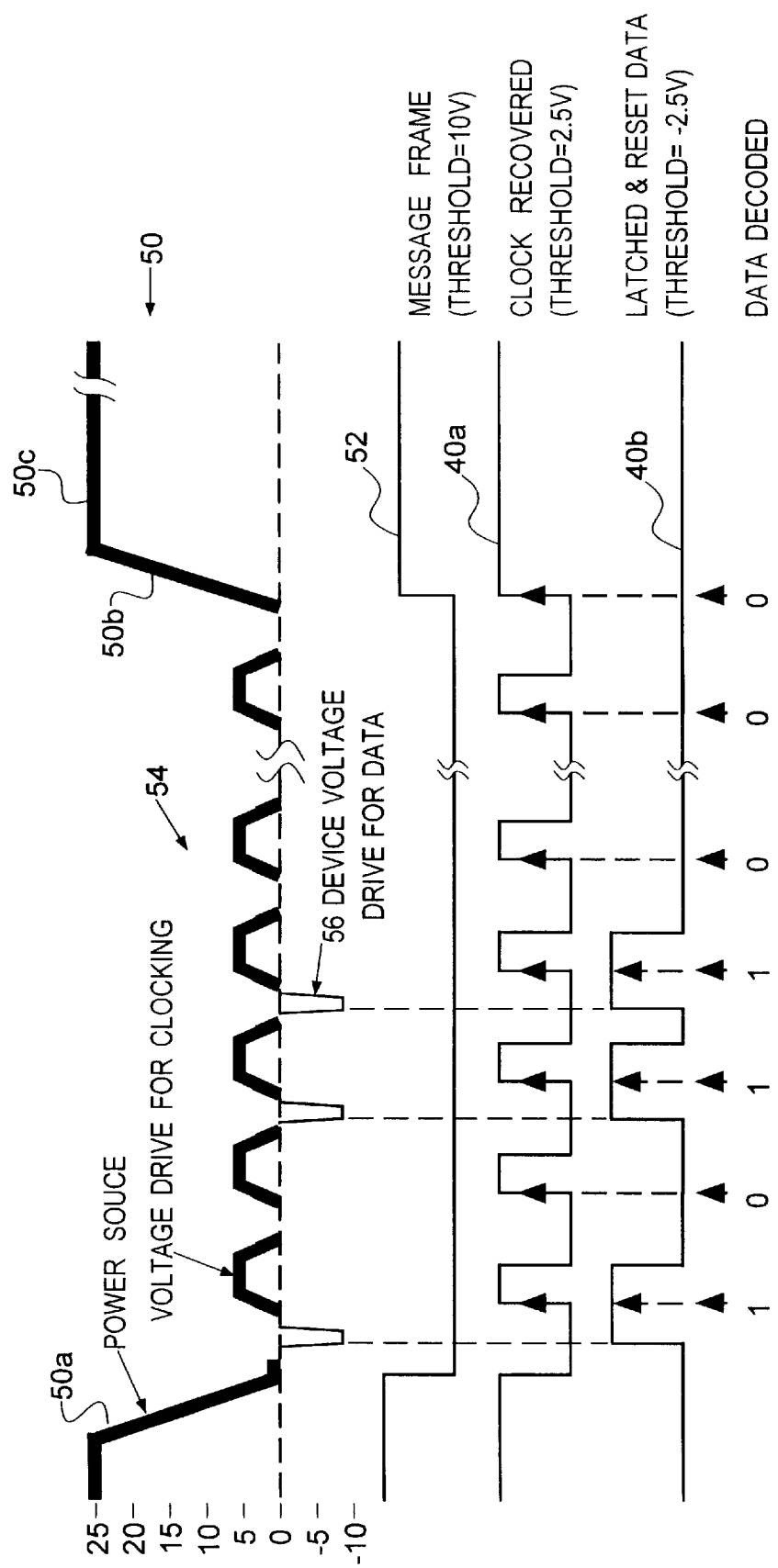
FIG. 3 is a set of timing diagrams illustrating a communications protocol usable with the system of FIG. 1.

FIG. 3 is a set of timing diagrams which further illustrates the communication protocol. A voltage signal 50 can be impressed upon the communications medium 14 by either control unit 12 or, if desired, one of the members of the pluralities 18 or 20.

The waveform 50 provides a message framing signal bounded by transitions 50a, indicating a message start and 50b indicating a message termination. Between message intervals, waveform 50, relative to the medium 14, exhibits a relatively high DC voltage level.

During inter-message intervals, waveform 50c could be coupled to the medium 14 via a power supply in unit 12 with a low output impedance. If desired, electrical energy can be supplied from the control unit 12 to the members of the pluralities 18 and 20 during these time intervals.

Interface circuitry 38c, for example in exemplary unit 30, is able to detect the start of a message indicated by framing signal 52. During a message frame, the voltage on medium 14 exhibits a relatively low value between message start transition 50a and message end transition 50b.

During the frame time interval, indicated by waveform 52, line 40d, the output power supply in the control unit 12 or any other unit which is providing framing signals must be capable of switching between high and low impedance states. As illustrated in waveform 50, the unit which is supplying synchronization signals which include the framing transitions 50a, 50b also provides a plurality of spaced apart voltage clock pulses indicated generally at 54. Clock pulses are transmitted on the medium 14 by output circuitry 12a with a low output impedance as discussed above.

During the time interval that each of the clock pulses is present on the medium 14, energy is also being supplied to those units, such as a unit 30 which have a power supply, such as power supply 36 coupled to the medium 14. The clock pulses 54 are all coupled to the medium with a first or positive polarity.

Between clock pulses, the synchronizing device assumes a high output impedance state. Other units, such as the common control unit 12 or members of the pluralities 18 or 20 can transmit voltage-type data pulses 56 on the medium 14 to be received by other members of the pluralities 18 and 20 as well as the control unit 12. During data intervals, those devices coupled to the medium 14 which are not transmitting data assume a high impedance state and can receive those data pulses. The data pulses 56 are transmitted on the medium 14 with a polarity which is different, or opposite, to the polarity of the clock pulses 54.

Impressing clock pulses on the medium 14 with a different polarity than that of the data pulses results in maximizing the receiving units' ability to separate clock and data pulses reliably. Since in the present protocol, clock signals and data signals are presented with different polarities, separation of the clock and the data can be carried out readily.

The detected polarity will determine which signals represent clock pulses and which signals represent data pulses. Additionally, the clock signals and the data signals, in accordance with the present protocol, will always occur at different time intervals. This contributes to an increased signal to noise ratio of the present system in that false clock signals or data signals resulting from ringing on the medium 14 can be rejected if the polarity of the noise signal does not correspond to the polarity of an expected clock or data signal.

The detected clock signals, present on the line 40a, and the displaced data signals, present on the line 40b, can then be coupled to control element 34 for processing at the unit 30. Alternately, the control unit 34 can generate a string of data pulses on the line 40c which can be transmitted via the medium 14 in-between clock pulses 54.

Figure 4:
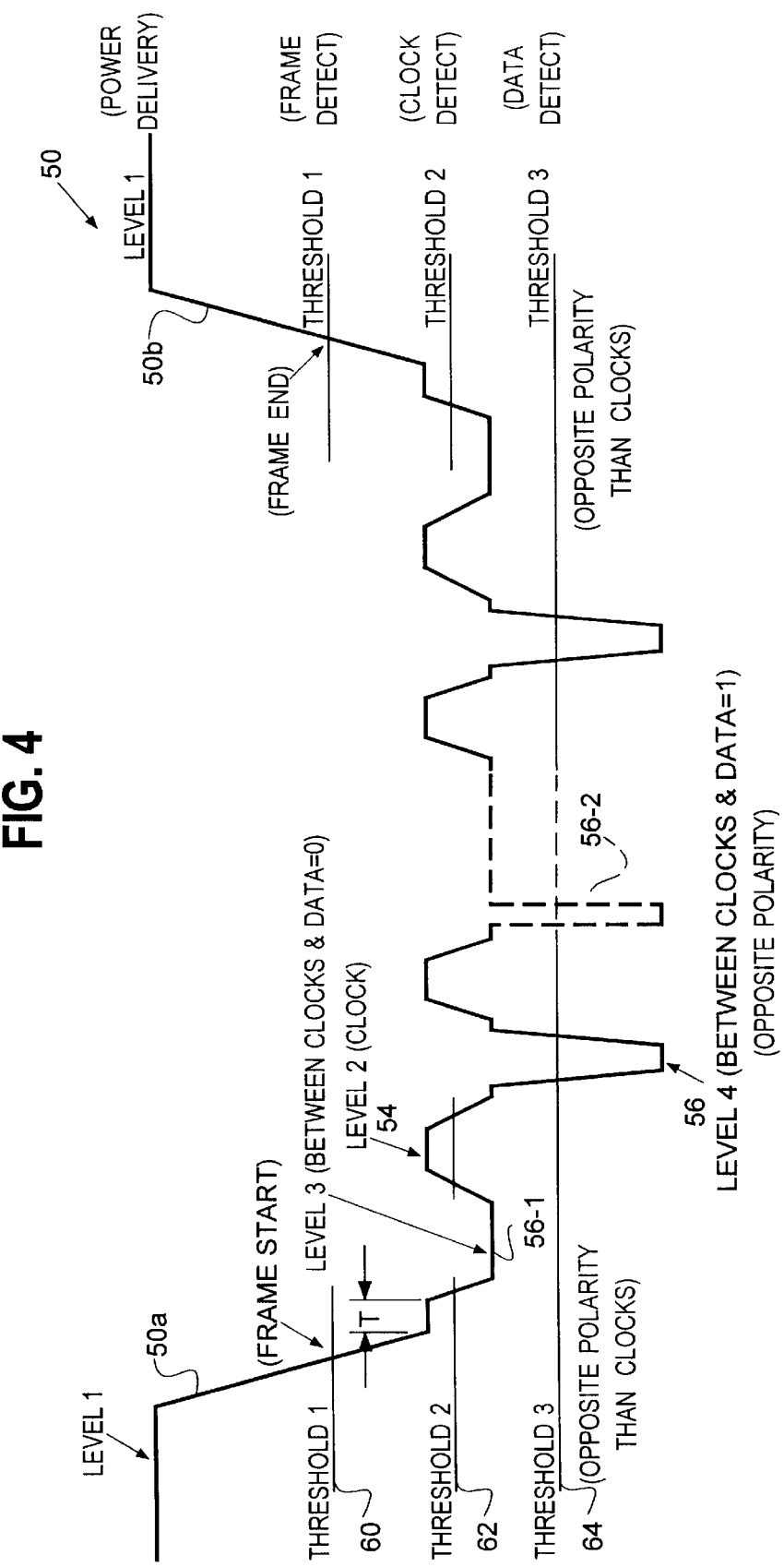
FIG. 4 is a more detailed diagram of a communication signal of FIG. 3.

FIG. 4 is a graph which illustrates further details of the signal 50 of FIG. 3. As illustrated in FIG. 4, the signal 50 exhibits a frame start/frame end threshold 60, detectable in framing threshold detection circuitry 38c. Signal 50 also exhibits a clock threshold 62 which can be used to detect the presence of the plurality of clock signals 54 via circuitry 38a.

A third threshold 64 functions to distinguish between a first polarity exhibited by the framing signals and the clock signals and a second, preferably opposite, polarity exhibited by a plurality of data signals 56. In one embodiment, where binary values are being transmitted via the medium 14, the presence of opposite polarity voltage pulses 56 could, for example, be indicative of the presence of logical 1. Logical zeros could be represented by an absence of the opposite polarity signals 56 as indicated at 56-1, FIG. 4.

Alternately, logical "one" signals can be transmitted as pulses 56 of a predetermined width. Logical "zero" can be transmitted, as indicated in phantom at 56-2, with a different width but of the same polarity as the pulses 56.

In addition, a stabilizing time interval T can be provided after frame start transition 50a and before a message starts such as before a data bit, such as 56-1, is transmitted. The stabilizing interval T can have a duration of less than 5 Msec, preferably in a range of 2–3 Msec.

Collision free communications can be enhanced by having the members of the pluralities 18 and 20 monitor the medium 14 when each respective device is carrying out a transmit operation. Detected voltage mismatches between the respective unit's intended communications sequence and that which is detected on the medium can cause the respective device to cease transmission and wait for the next framing interval to re-initiate transmission.

Circuitry 34a can compare a sequence of data output signals on line 40c to respective signals actually present on the medium 14 as detected by threshold circuitry 38b. Where a given data output pulse sequence differs from a pulse sequence present on the medium 14, that difference indicates to the respective electrical 30 that at least one other unit is attempting to communicate at the same time via medium 14.

Since a transmitting electrical unit transmits a voltage pulse, such as the pulses 56 with a low impedance output, the presence of one or more of those pulses on the medium 14 will override any respective output signals from other electrical units corresponding to, for example, a logical zero, 56-1 which are output via the respective electrical unit with a high impedance output state. Thus, the electrical unit which detects the mismatch can terminate communication temporarily until it detects a subsequent frame start signal and perhaps an associated command which will authorize further transmission on the medium 14.

The above described voltage drive protocol minimizes noise or losses due to leakage in the transmission medium 14. This would include leakage in conductive cables, wires or other sources of shunt impedance which might be present or cross the lines and not related to data transmission. By way of example, if the high level output impedance of the interface 12a corresponds to something on the order of 2000 ohms, since a transmitting electrical unit transmits at a very low output impedance state, even a shunt on the order of 100 ohms will not interfere with communications of data on the medium 14.

Thus, using the above-described protocol members of the plurality 18 can communicate information to members of the plurality 20 during message frames generated for example by common control unit 12. Alternately, and without limitation, the framing signals and clock pulses could be generated by any other electrical unit coupled to the medium 14.

It will be understood that neither the contents of the messages being transmitted nor the detailed circuitry of the members of the pluralities 18 or 20 are limitations of the present invention. It will also be understood that, if desired, the control unit 12 could, but need not, be the primary source of framing and clock signals in the system 10. In such an instance, the members of the pluralities 18 and 20 could communicate among themselves without directly communicating with the common control unit 12 but still operate within a synchronizing scheme established by that common control unit.

Figure 5:
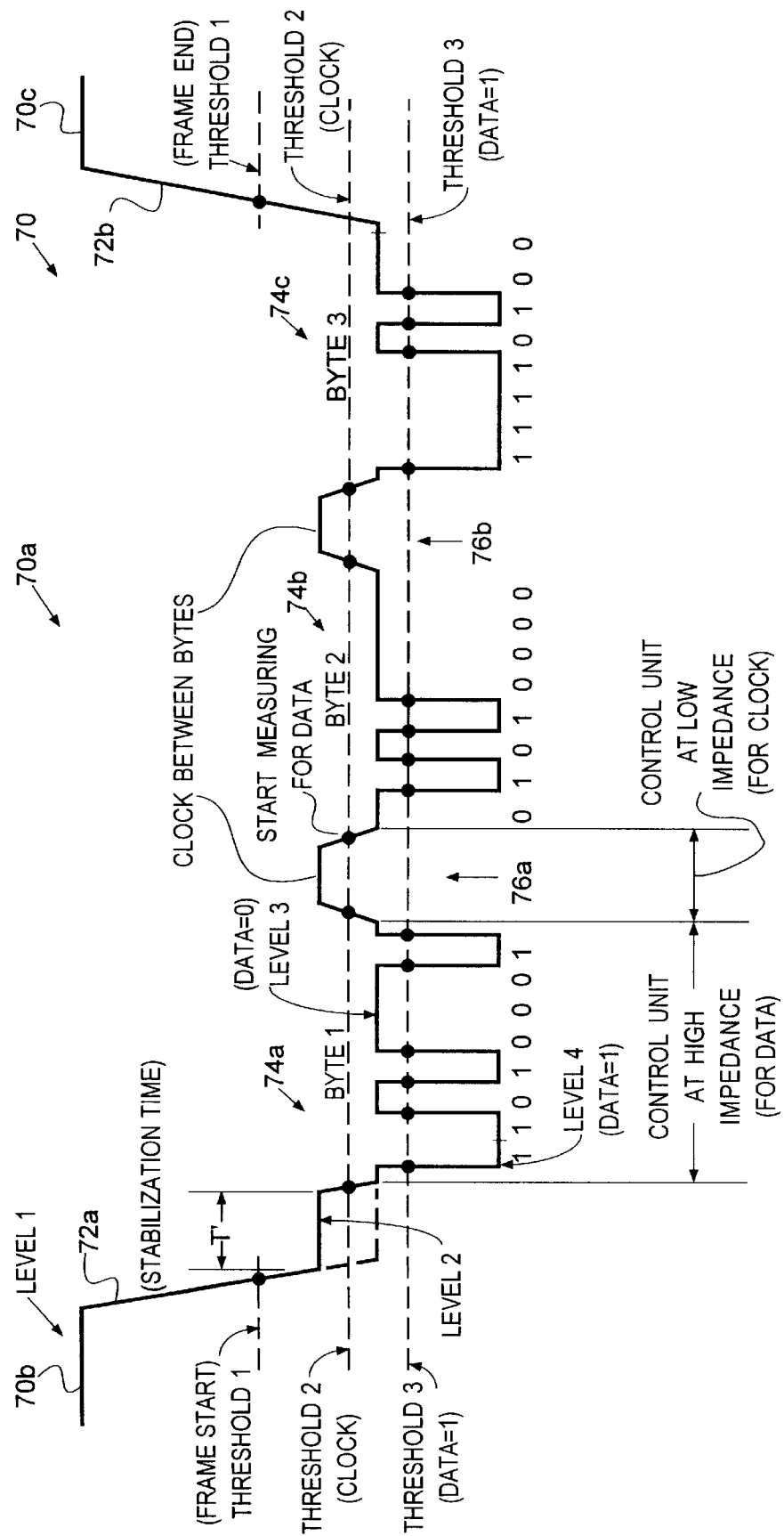
FIG. 5 is a diagram illustrating an alternate form of a communications signal.

FIG. 5 illustrates an alternate communication protocol exemplified by waveform 70. Waveform 70 includes a frame interval 70a bounded by a preframe voltage level 70b and a postframe voltage level 70c. During the preframe and postframe intervals, signals 70b, 70c provide energy to the pluralities of the devices such as devices 18 and 20.

Message frame 70a is defined by a frame start transition 72a and a frame ending transition 72b. Subsequent to frame start transition 72a, a stabilization time T' is provided. During this time interval between frame start transition 72a and any subsequent message or messages, any residual currents on the communication link 14 have an opportunity to dissipate or decrease to a level that will not interfere with communication of subsequent messages.

In the protocol of FIG. 5, a plurality of bytes 74a, 74b and 74c are serially transmitted between an end of the stabilization interval T' and frame end transition 72b. For synchronization purposes, interbyte clock pulses 76a and 76b are transmitted on the medium with a polarity opposite the polarity of the data pulses corresponding to a logical "one". Data signals corresponding to a logical "zero", as illustrated in FIG. 5, are transmitted at a level 3 amplitude.

During the stabilization time interval T' as well as during the clock pulses 76a, 76b, the source switches to a relatively low output impedance. The source then switches to a high impedance mode between clock signals thereby enabling communicating devices, such as members of the pluralities 18 and 20 to impress data signal voltage-type pulses on the link 14 with a polarity opposite that of the polarity of the clock signals.

Figure 6:
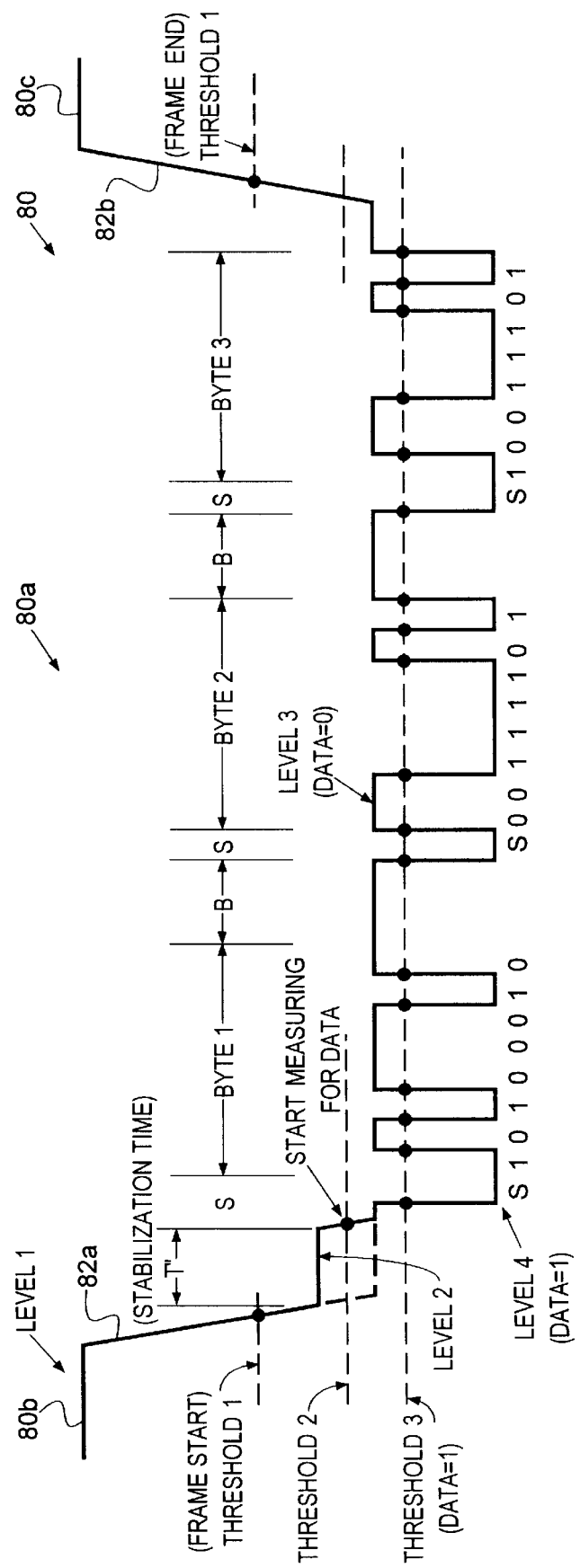
FIG. 6 is a diagram illustrating yet another form of a communications signal.

FIG. 6 illustrates via a waveform 80 an alternate communications protocol. Waveform 80 includes a message frame interval 80a which is bounded by a preframe level 80b and a postframe level 80c. During the intervals where the levels 80b, 80c are present, power can be supplied via medium 14 to the members of the pluralities 18 and 20.

Frame 80a is bounded by frame start transition 82a and a frame end transition 82b. Subsequent to frame start transition 82a, a stabilization time T" is provided, corresponding to the stabilization time interval T' discussed previously.

Unlike the protocol of FIG. 5, the protocol of FIG. 6 does not incorporate clock signals as previously discussed in FIGS. 4 and 5. Instead, at the end of stabilization interval T", a data start signal S can be detected followed by an initial byte of information, a sequence of binary one and binary zero representations. Subsequently, an interbyte interval B is provided. Interval B is followed by another start signal S and a second byte of information represented by binary one and binary zero representations. After yet another interbyte interval B and another start signal S, a third byte of information can be transmitted in the same frame. The third byte is terminated by the frame end transition 82b.

Those of skill in the art will understand that the frame start transition 82a and the frame end transition 82b can be used as an alternate to having the clock signals 76a, 76b of the waveform 70 of FIG. 5. In this instance, frame start transition 82a could also enable a local clock of an appropriate frequency for clocking data signals.

Figure 7:
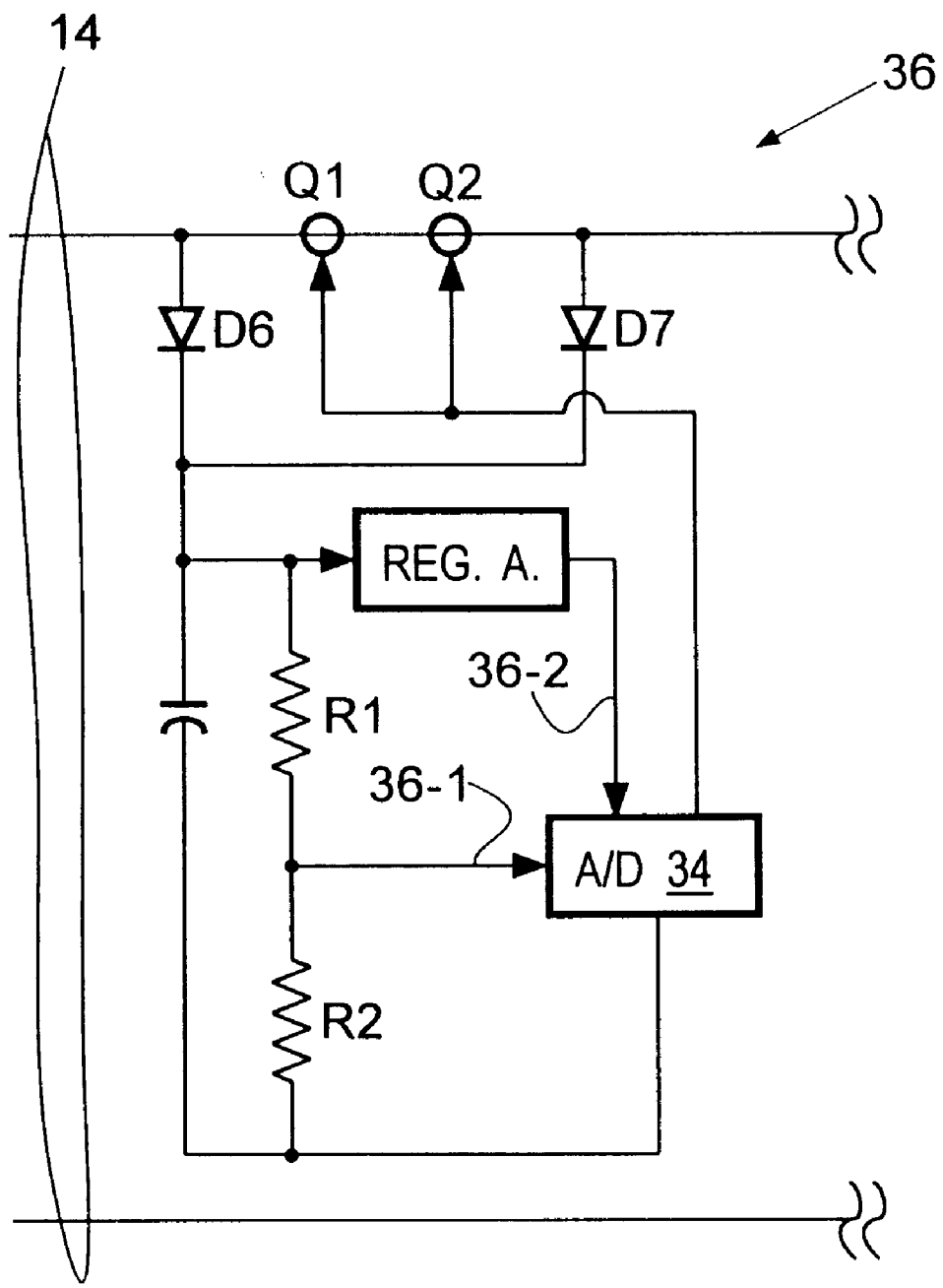
FIG. 7 is a schematic of a monitorable power supply usable in the device of FIG. 2.

FIG. 7 illustrates additional details of supply 36. Diodes D6, D7 provide energy to supply 36 from either direction of link 14. Solid state switches Q1, Q2 can be open circuited for various purposes as would be understood by those of skill in the art.

Energy from the link 14, supplied during time intervals 50c, 70c, 80c, charges capacitor C15. Voltage across capacitor C15 is coupled to series resistors R1, R2 as well as to regulator Reg. A. A regulated electrical output, on line 36-2 provides electrical energy to power the respective device.

A monitorable voltage on the line 36-1 is coupled to an analog input of processor 34. Processor 34 can in turn digitize and monitor the voltage while the device is in normal operation. If inadequate operational voltage is detected, a message can be transmitted via link 14 to one or more of the other devices of the system.

Figure 8:
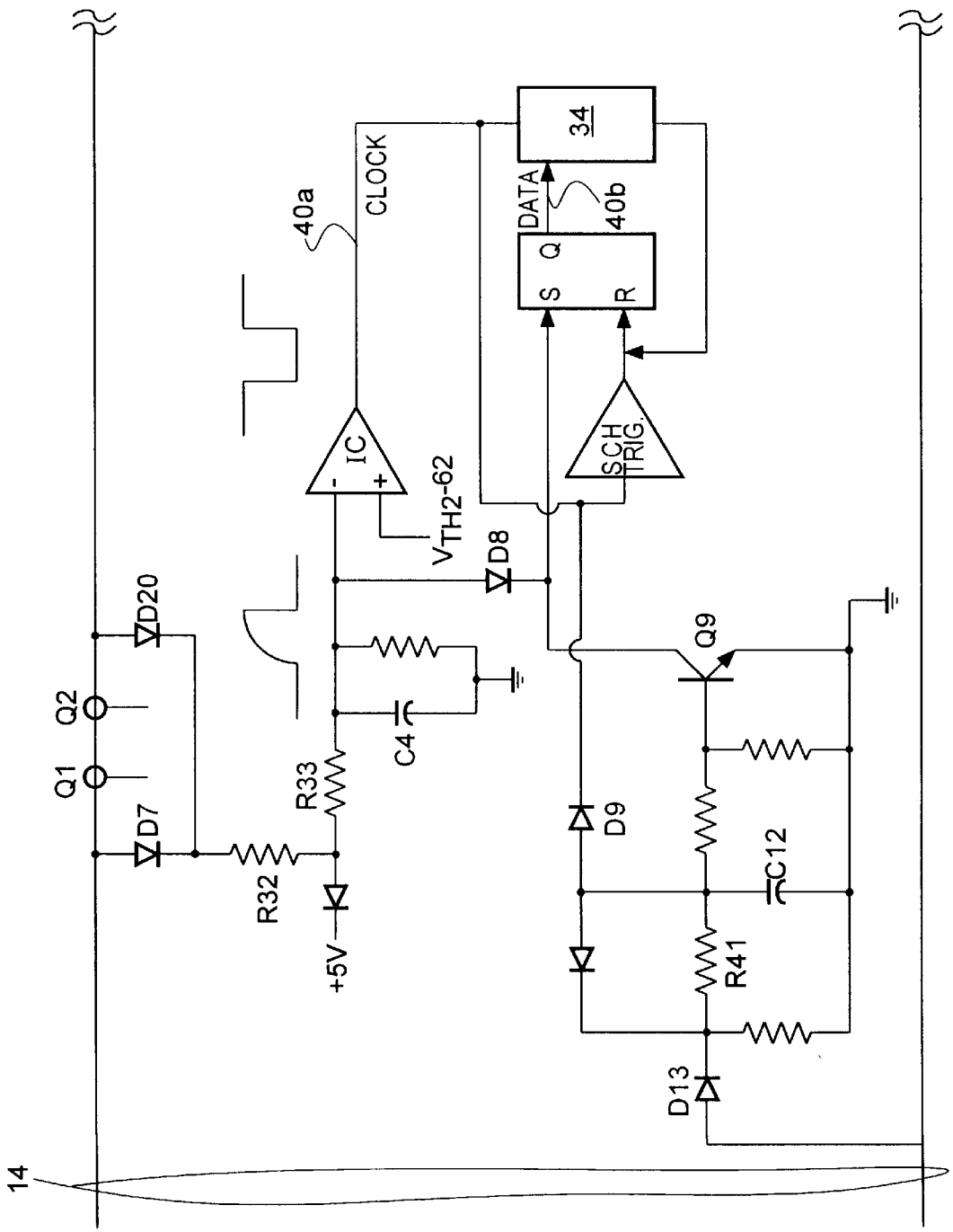
FIG. 8 is a schematic of clock/data lock-out circuitry of a type usable in the device of FIG. 2.

FIG. 8 illustrates details of clock lockout/data lockout circuitry which can be incorporated in circuitry 38a, b. The data signals are received in the device through diode D13. The received data signals, for example as illustrated in the waveform of FIG. 4, charge a capacitor C12 through resistor R41. The voltage across capacitor C12 is divided down and provides base drive to a transistor switch Q9 which switches to a low output impedance when the voltage on capacitor C12 exceeds a predetermined threshold, corresponding to threshold 3, FIG. 4.

When Q9 switches to a low impedance, it will discharge the voltage on the clock input capacitor C4 through diode D8. Capacitor 64 is prevented from charging and detecting a clock signal while the data detect signal is present.

The clock is received in the device through diode D20 or D7. The clock signal charges a capacitor C4 through resistors R32 and R33. The voltage on capacitor C4 is compared to a reference voltage at the input of comparator IC corresponding to threshold 2, FIG. 4. If the voltage at the input of comparator IC exceeds the reference voltage, comparator IC switches to a low impedance.

When comparator IC switches to a low output impedance, it will discharge the voltage on the data input capacitor C12 through diode D9. Capacitor C12 is thereby prevented from charging and detecting a data signal while a clock detect signal is present.

The above described circuitry does not allow a false data signal to occur during a clock detect time interval nor does it allow a false clock signal during a data detect time interval. This prevents transient signals form causing false signals.

The monitoring and lockout circuitry of FIGS. 7, 8 have been described with respect to a wired communications medium which could correspond to an optical or electrical link. It will be understood that the inventions hereof are not so limited. Either circuit can be used alone, or in combination with wireless devices. Such devices could communicate via RF or infrared transceivers. Energy can be provided to a respective device via received wireless signals or local battery which might, but need not, be rechargeable.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A self-monitoring electrical unit which receives operational electrical energy from a multi-conductor cable comprising:

at least first and second terminals for connecting to different conductors of the cable;

a storage element, coupled to the terminals wherein the element receives and stores electrical energy from the cable;

a circuit for monitoring an electrical parameter, wherein the parameter is indicative of energy stored at the element; and circuitry, coupled to the monitoring circuitry, for transmitting a signal, indicative of energy stored at the element, to the cable via the terminals.

2. An electrical unit as in claim 1 wherein the monitoring circuitry produces an electrical signal indicative of the electrical parameter and which includes circuitry for comparing a representation of the electrical signal to a predetermined value.

3. An electrical unit as in claim 1 which includes circuitry for detecting the presence of clock pulses and data pulses, received at the terminals, from the cable.

4. An electrical unit as in claim 3 which includes data detect circuitry for excluding false clock signals in the presence of a data detect signal.

5. An electrical unit as in claim 3 which includes clock detect circuitry for excluding false data signals in the presence of a clock detect signal.

6. An electrical unit as in claim 2 wherein the comparing circuitry comprises a programmed processor.

7. An electrical unit as in claim 6 which incudes an ambient condition sensor coupled to the programmed processor.

8. An electrical unit as in claim 7 which includes circuitry for excluding false data signals in the presence of a clock detect signal.

9. An electrical unit as in claim 8 which includes circuitry for excluding false clock signals in the presence of a data detect signal.

10. An electrical device for a multiple device communication system comprising:
    at least a communications port;
    a programmed processor coupled to the port;
    an energizable supply for providing operating electrical energy to at least the processor wherein the supply includes an energy indicating signal coupled to an energy monitoring input port of the processor; and
    executable instructions, coupled to the processor for monitoring a representation of the indicating signal and for generating a message, transmittable from the output port, indicative thereof.

11. A device as in claim 10 which includes in the supply, energy storage circuitry coupled to the port.

12. A device as in claim 11 wherein the energy storage circuitry includes a capacitor and electrical components coupled thereto to form a representation of energy stored at the capacitor as the indicating signal.

13. A device as in claim 10 which includes noise rejection circuitry, coupled to the port, for rejecting false signals received thereat.

14. A device as in claim 13 wherein the port receives clock signals and data signals and the rejection circuitry includes circuitry to reject false, non-data signals in the presence of valid data signals.

15. A device as in claim 13 wherein the port receives clock signals and data signals and the rejection circuitry includes circuitry to reject false, non-clock signals in the presence of valid clock signals.

16. A device as in claim 14 wherein the rejection circuitry includes data storage circuitry for suppressing non-data signals.

17. A device as in claim 14 wherein the rejection circuitry includes clock storage circuitry for suppressing non-clock signals.

18. A device as in claim 16 wherein the data storage circuitry is coupled to clock detect circuitry and wherein the data storage circuitry disables the clock detect circuitry in the presence of valid data signals.

19. A device as in claim 17 wherein the clock storage circuitry is coupled to data detect circuitry and wherein the clock storage circuitry disables the data detect circuitry in the presence of valid clock signals.

20. A device as in claim 16 wherein the data storage circuitry includes a storage element coupled to at least one solid state switching device.

21. A device as in claim 17 wherein the clock storage circuitry includes a storage element coupled to at least one solid state switching device.

22. A device as in claim 13 which includes an ambient condition sensor.

23. A device as in claim 13 which includes a wireless transceiver coupled to the port and the processor.

24. A device as in claim 23 which includes at least one ambient condition sensor selected from a class which includes a fire sensor, a gas sensor, a position sensor, a light sensor, a motion sensor, a card reader and a keyboard.

25. A device as in claim 13 wherein the port comprises interface circuitry for coupling to one of an electrical or an optical communications link wherein energy is coupled to the supply via the link.

26. A device as in claim 25 which includes an ambient condition sensor.

27. A device as in claim 26 which includes a smoke sensor and wherein the noise rejection circuitry includes circuitry for discriminating between valid and invalid signals received from the communications link.

28. A device as in claim 10 wherein the energy indicating signal is a voltage indicating signal.

29. A device as in claim 10 wherein the energy indicating signal is continuously coupled to an energy monitoring input port of the processor.

30. A device as in claim 10 wherein a representation of the energy indicating signal is stored in a processor.

31. A device as in claim 10 wherein the device message, transmittable from the output port, is sent in response to a message from another device requesting said representative of the energy indicating signal.

32. A device as in claim 10 wherein the device message is broadcast onto the system without receiving a message from another device requesting said information.

33. A device as in claim 10 wherein the supply is intermittently provided with operating electrical energy.

34. A device as in claim 2 wherein the device transmits an electrical signal indicating that the said representation is higher than the predetermined value.

35. A device as in claim 2 wherein the device transmits an electrical signal indicating that the said representation is lower than the predetermined value.

36. A device as in claim 1 wherein the energy indicating signal is a voltage indicating signal.

37. A device as in claim 1 wherein the energy indicating signal is continuously coupled to an energy monitoring input port of the processor.

38. A device as in claim 1 wherein a representation of the energy indicating signal is stored in a processor.

39. A device as in claim 1 or claim 34 or claim 35 wherein the said electrical signal is a message sent in response to a message from another device requesting said representative of the energy indicating signal.

40. A device as in claim 1 or claim 34 or claim 35 wherein the said electrical signal is a message broadcast onto the system without receiving a message from another device requesting said information.

41. A device as in claim 1 wherein the supply is intermittently provided with operating electrical energy.

42. A unit as in claim 1 wherein the circuit for monitoring monitors a voltage at the storage element, and wherein the circuitry transmits the signal when the monitored voltage is inadequate.

43. A unit as in claim 42 which includes circuitry for comparing the voltage to a predetermined value.

44. A unit as in claim 43 wherein the circuitry transmits the signal when the monitored voltage is below the predetermined value.

45. A unit as in claim 43 wherein the comparing circuitry comprises a programmed processor with pre-stored executable instructions.

46. An electrical device for a multiple device communication system comprising:

a communications port;

a circuit within the device to monitor a selected voltage at the communications port; and executable instructions within the circuit for generating a signal, transmittable to the communications port when said voltage is below a predetermined threshold.

47. An electrical device for a multiple device communication system comprising:

a communications port;

a power supply port;

a circuit within the device to monitor the voltage at the power supply port; and executable instructions within the circuit for generating a signal, transmittable to the communications port when the voltage is below a predetermined threshold.

48. An electrical device for a multiple device communication system comprising:

a communications port;

a circuit within the device to monitor an average voltage at the communications port; and executable instructions within the circuit for generating a signal, transmittable to the communications port when said average voltage is below a predetermined threshold.

49. A device as in claim 47 wherein said signal is a digital message comprising a series of bits.

50. A device as in claim 47 wherein the circuit continually monitors the voltage and automatically executes instructions to generate the signal.

51. A device as in claim 47 wherein the circuit monitors the voltage and executes the instructions based upon an external signal received at the communications port.

52. A device as in claim 47 wherein the voltage is stored within the device.

53. An electrical device for use in a multiple device communication system comprising:

a port for receiving electrical energy and for transmitting an electrical signal;

a rechargeable power supply, coupled to the port, wherein electrical energy from the port recharges the supply;

a circuit for monitoring an output voltage of the supply; and an output circuit, responsive to the monitoring circuit, for coupling a signal to the port indicative of the output voltage of the supply.

54. A device as in claim 53 wherein the monitoring circuit includes a programmed processor and a pre-stored voltage value, and, wherein the signal indicates that the voltage of the supply is less than the pre-stored value.

\* \* \* \* \*